(12) United States Patent
Hamaji et al.

(10) Patent No.: US 7,993,127 B2
(45) Date of Patent: Aug. 9, 2011

(54) BLOW MOLDING DEVICE

(75) Inventors: Soji Hamaji, Aichi Prefecture (JP);
Yasuaki Nakamura, Aichi Prefecture (JP); Yuji Shimizu, Aichi Prefecture (JP)

(73) Assignee: FTS Co., Ltd., Toyota, Aichi Prefecture (JP)

( * ) Notice: Subject to any disclaimer, the term of this patent is extended or adjusted under 35 U.S.C. 154(b) by 132 days.

(21) Appl. No.: 12/585,801

(22) Filed: Sep. 24, 2009

(65) Prior Publication Data

US 2010/0092600 A1     Apr. 15, 2010

(30) Foreign Application Priority Data

Sep. 26, 2008   (JP) .................................. 2008-248038

(51) Int. Cl.
*B29C 49/20*     (2006.01)
(52) U.S. Cl. ....................................... 425/503; 425/532
(58) Field of Classification Search .................. 425/503, 425/522, 532; 264/515, 516
See application file for complete search history.

(56) References Cited

U.S. PATENT DOCUMENTS

| 3,954,369 A | * | 5/1976 | Kormendi ..................... 425/532 |
| 4,719,072 A | * | 1/1988 | Kojima et al. ................ 264/515 |

FOREIGN PATENT DOCUMENTS

JP     6-143396     5/1994

* cited by examiner

*Primary Examiner* — Robert B Davis
(74) *Attorney, Agent, or Firm* — McGinn IP Law Group, PLLC

(57) ABSTRACT

A blow molding device capable of securely holding a built-in part in a prescribed position in an interior of a blow molded article with a compact equipment. The blow molding device includes a blow mold and a built-in part holding unit. The built-in part holding unit includes a holding rod adapted to hold the built-in part and arranged to freely advance and retreat to be removed from the blow mold. The blow mold includes a slide core in each of two mold members so as to freely advance and retreat relative to a cavity of the blow mold, and a drive control pin in each of mating faces of split two mold members, and the drive control pin and the slide core are linked with a linking member. The slide core is driven with the drive control pin such that when the blow mold is closed, the slide core retreats from an interior of the cavity to a molding surface defining the same at the same speed as the closing speed of the blow mold.

4 Claims, 9 Drawing Sheets

BLOW MOLDING DEVICE

CROSS-REFERENCE TO RELATED APPLICATION

This application is related to and claims priority from Japanese patent application No. 2008-248038 incorporated herein by reference.

BACKGROUND OF THE INVENTION

1. Field of the Invention

The present invention relates to a blow molding device adapted to form a blow molded article from a thermoplastic synthetic resin, and more particularly, to a blow molding device adapted to form a blow molded article of which an outer wall is formed from a thermoplastic synthetic resin through blow molding and which has a built-in part in an interior thereof.

2. Description of Related Art

Conventionally, tubular blow molded articles, such as fuel tanks for use in motor vehicles, etc., have been formed of metal, but, in recent years, thermoplastic synthetic resins have been frequently used to form such tubular blow molded articles, because they can effect lightweight vehicle bodies, no rust is generated therein, and they can be readily formed into desired configurations.

In many cases, the tubular articles made of thermoplastic synthetic resins have been formed by the blow molding method, because tubular bodies can be readily formed. With the blow molding method, a parison of a molten thermoplastic synthetic resin formed into a cylindrical configuration is extruded from the upper side of a mold, and air is blown into the parison while the parison is being held with the mold, thereby forming the tubular bodies.

On the other hand, the blow molding method has been required to provide built-in parts such as valves, baffle plates adapted to restrain noise caused by the flowing of fuel, etc. in an interior of the blow molded article, such as the fuel tank.

Accordingly, in order to provide the built-in parts in the interior of the fuel tank, a device shown in FIGS. 1 through 4 has been used (see published Japanese patent application No. Hei 6-143396, for example.).

As shown in FIG. 1, a built-in part 10 is placed on a holding rod 12 before lowering a parison 14 in a blow mold 16, and the blow mold 16 is opened to position the built-in part 10 in an interior thereof. Next, the parison 14 is lowered with the blow mold 12 left open such that the built-in part 10 is positioned in the interior of the parison 14.

Then, as shown in FIG. 2, slide cores 18 are made to project from both sides of the blow mold 16 before the blow mold 16 is closed to press the parison 14 against side edges of the built-in part 10. As a result, the parison 14 can be fused to the side edges of the built-in part 10, because an interior surface of the parison 14 has not become solid.

Next, as shown in FIG. 3, the holding rod 12 is lowered, the blow mold 16 is closed, and the parison 14 is pushed with the slide cores 18 to hold the built-in part 10. And a blow pin 20 is pierced through the parison 14 to blow air from blowing means 22, thereby carrying out the blow molding.

And, as shown in FIG. 4, the parison 14 is pressed against a molding surface of the blow mold 12, which defines a cavity thereof, thereby forming a tubular body.

In order to continuously hold the built-in part 10 with the slide cores 18 from the time the blow mold 12 is opened, as shown in FIG. 2, until the blow mold 12 is closed, as shown in FIG. 3, the slide cores 18 have been required to retract gradually from the interior of the cavity with slide core driving means 24 according to the closing of the blow mold 16. To this end, the slide core driving means 24 must be provided separately from the blow mold 12, and consequently, the device costs and the maintenance costs increase.

SUMMARY OF THE INVENTION

Accordingly, it is an object of the present invention to provide a blow molding device for forming a blow molded article having a built-in part, which is capable of securely holding the built-in part in a prescribed position in an interior of the blow molded article with a compact equipment.

According to a first aspect of the present invention, the blow molding device has a blow mold adapted to form an outer wall of a blow molded article, and a built-in part holding unit adapted to hold the built-in part in the blow molded article, which is provided in an opening and closing section of the blow mold. The blow mold has two mold members split along a parting line thereof. The two mold members define a cavity adapted to form the outer wall of the blow molded article in a molding surface thereof while holding a parison therewith. The built-in part holding unit has a holding rod adapted to hold the built-in part, and the holding rod is arranged to freely advance and retreat such that when the blow mold is opened, the built-in part is held in a position facing the cavity of opened blow mold, when the blow mold is closed, the built-in part is positioned in an interior of the parison, and after the parison is held with the blow mold, the holding rod is removed from the blow mold. Each of the two mold members of the blow mold has a slide core that is provided in such a position as to hold the built-in part and the parison so as to freely advance and retreat relative to the cavity when the blow mold is closed, a drive control pin that is provided in each of mating faces of the mold members, and a linking member provided to link the drive control pin to the slide core such that the slide core is driven with the drive control pin. And the slide core is arranged such that when the blow mold is closed, the slide core retreats from an interior of the cavity to a molding surface defining the cavity at the same speed as the closing speed of the blow mold.

In the first aspect of the present invention, the blow molding device has a blow mold adapted to form an exterior wall of a blow molded article, and built-in part holding unit adapted to hold the built-in part in the blow molded article, which is provided in an opening and closing section of the blow mold. With this arrangement, upon blow molding, the built-in part can be attached to a prescribed position in an interior of the parison adapted to form the exterior wall of the blow molded article, in an interior of the blow mold.

The blow mold has two mold members split along a parting line thereof, the two mold members define a cavity adapted to form an exterior wall of the blow molded article in a molding surface thereof while holding a parison therewith. With this arrangement, by inflating the parison held in the cavity of the blow mold, the blow molded article with a desired configuration can be formed.

The built-in part holding unit has a holding rod adapted to hold the built-in part. The holding rod is arranged to freely advance and retreat such that when the blow mold is opened, the built-in part is held in a position facing the cavity of opened blow mold, when the blow mold is closed, the built-in part is positioned in an interior of the parison, and after the parison is held with the blow mold, the holding rod is removed from the blow mold. With this arrangement, when the blow mold is opened, the built-in part is held in the cavity of the blow mold, and after the built-in part is attached to the interior of the parison held with the blow mold, an opening of the parison can be securely closed.

Each of the two mold members split along a parting line thereof has a slide core that is provided in such a position as to hold the built-in part and the parison so as to freely advance and retreat relative to the cavity when the blow mold is closed. With this arrangement, the built-in part can be held in a prescribed position within the parison, and the parison can be fused to the built-in part upon closing the blow mold.

A drive control pin is provided in each of the two mold members split along a parting line thereof so that the two drive control pins provided in the two mold members can be moved similarly according to the movement of the blow mold upon closing the same.

A linking member is provided to link the drive control pin and the slide core with each other to drive the slide core with the drive control pin. With this arrangement, by transmitting the movement of the drive control pin to the slide core via the linking member the slide core can be driven, whereby the driving means for the slide core can be made compact, and consequently, the drive control can be facilitated according to the closing of the blow mold.

The closing speed of the blow mold is made equal to the retreating speed of the slide core from an interior of the cavity to a molding surface defining the cavity so that when the blow mold moves upon closing the blow mold, the slide cores on both sides continuously hold the built-in part, leaving a constant space therebetween, and consequently, the built-in part can be stably held within the parison.

According to a second aspect of the present invention, the drive control pin provided in each of the mold members projects from each of mating faces of the mold members. With this arrangement, when the blow mold is closed, tip ends of the drive control pins contact each other simultaneously when the slide cores hold the built-in part and the parison, and consequently, the slide cores link with the drive control pins and retreat from the interior of the cavity at the same speed as the closing speed of the mold members.

In the second aspect, the drive control pin is provided in each of the mold members so as to project from each of mating faces of the mold members, and when the blow mold is closed, tip ends of the drive control pins contact each other simultaneously when the slide cores hold the built-in part and the parison. Therefore, the slide cores can retreat with the drive control pins simultaneously with the holding of the built-in part and the parison with the slide cores.

Since the slide cores link with the drive control pins at the same speed as the closing speed of the mold members while holding the built-in part and the parison, and retreat from the cavity at the same speed, the retreating of the slide cores can be synchronized with the movement of the mold members, and consequently, the slide cores on both sides can continuously hold the built-in part, leaving a constant space therebetween, and the driving means for the slide cores can be made compact.

According to a third aspect of the present invention, the drive control pin provided in each of the mold members projects from each of mating faces of the mold members such that when the blow mold is closed, a tip end of each of the drive control pins contacts a facing mating face of each of the mold members simultaneously with the holding of the built-in part and the parison with the slide cores, and the linking member has a reducing mechanism of reducing the retreating speed of the slide core to half of that of the drive control pin, whereby the slide core retreats from the interior of the cavity to a molding surface thereof at the same speed as the closing speed of the mold members.

In the third aspect of the present invention, the drive control pin attached to each of the two mold members split along a parting line is provided to project from the mating face of the blow mold, and when the blow mold is closed, the tip end of the drive control pin contacts the mating face of the mold member simultaneously with the holding of the built-in part and the parison with the slide core. Therefore, the tip end of the drive control pin securely contacts the mating face of the mold member, and the slide cores on both sides can retreat with the drive control pins simultaneously with the holding of the built-in part and the parison with the slide cores.

The slide core can retreat from the interior of the cavity to the molding surface thereof with the linking member having a reducing mechanism of reducing the retreating speed of the slide core to half of that of the drive control pin at the same speed as the closing speed of the mold member. Therefore, where the retreating speed and the moving distance of the drive control pin are twice as large as that of the mold member of the blow mold, the retreating speed and the moving distance of the slide core can be made equal to those of the blow mold.

According to a fourth aspect of the present invention, the drive control pin is continuously biased with a drive control spring provided in the mating face of the mold member in such a direction as to project from the mating face of the mold member so that the slide cores can contact the parison simultaneously with the contacting of the tip ends of the drive control pins each other or contacting of the tip ends of the drive control pins and the mating faces of the facing mold members, whereby the drive control pins can move with the movement of the blow mold.

In accordance with the present invention, the drive control pin is provided in each of the mating faces of the two mold members of the blow mold, which is capable of opening and closing upon closing the blow mold so that upon closing the blow mold, the drive control pins can be moved with the movement of the blow mold.

Since the drive control pin and the slide core are linked with a linking member such that the slide core is driven with the drive control pin, the drive means for the slide core can be made compact and the drive control operation can be facilitated.

When the blow mold is closed, the retreating speed of the slide core from the cavity is made equal to the closing speed of the blow mold so that the built-in part can be continuously held with the slide cores, leaving a constant space therebetween when the blow mold moves upon closing the same.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 8 is a sectional view of a first embodiment of a blow molding device, which shows a process similar to that of FIG. 7, wherein drive control pins contact each other, and slide cores hold a built-in part in;

DETAILED DESCRIPTION OF THE PREFERRED EMBODIMENTS

Hereinafter, embodiments of a blow molding device of the present invention will be explained based on a blow molding device adapted to form a fuel tank for use in a motor vehicle, as a blow molded article with reference to FIG. 5 through FIG. 15.

Figure 1:
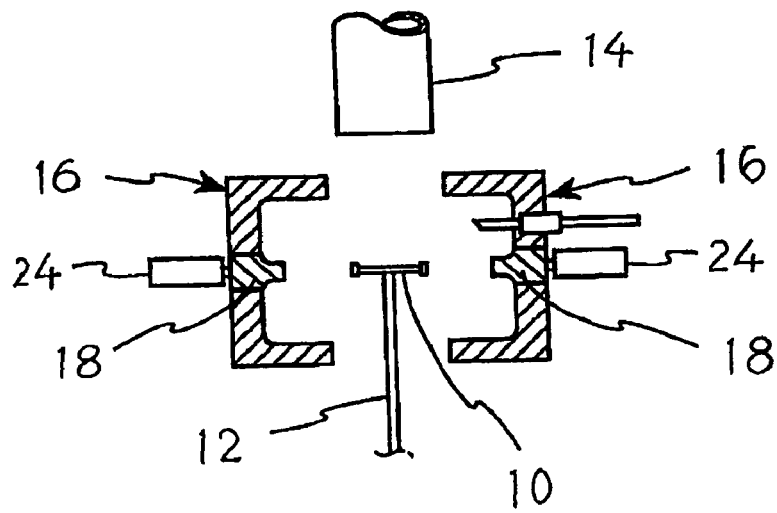
FIG. 1 is a sectional view of a blow mold used in a conventional fuel tank producing device, which is in an open state.
Figure 2:
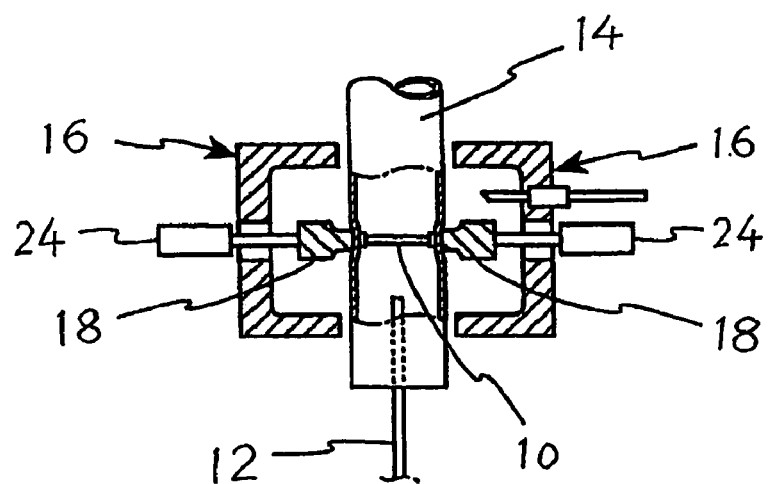
FIG. 2 is a sectional view of a blow mold used in a conventional fuel tank producing device, which is in a state where slide cores are slid.
Figure 3:
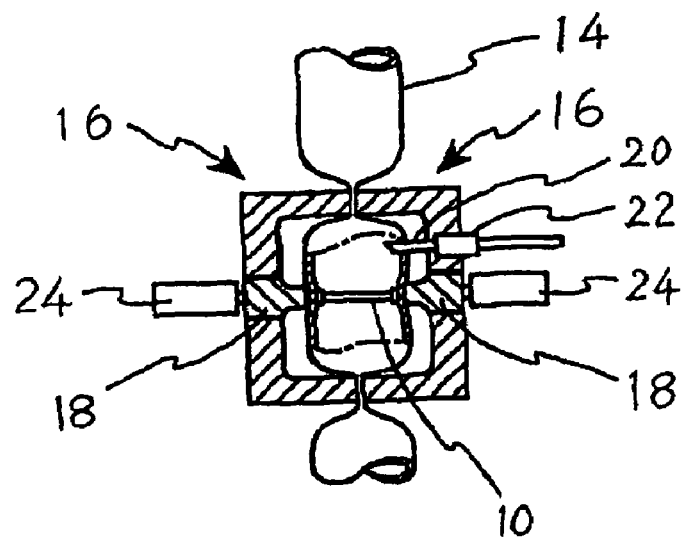
FIG. 3 is a sectional view of a blow mold used in a conventional fuel tank producing device, which is in a closed state.
Figure 4:
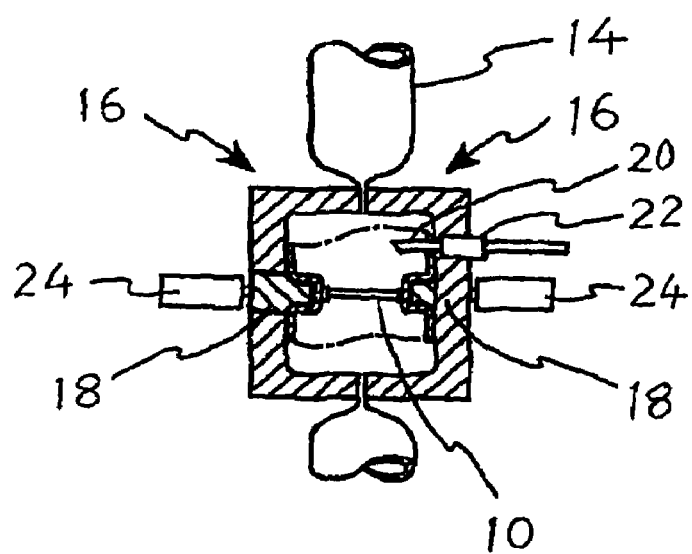
FIG. 4 is a sectional view of a blow mold used in a conventional fuel tank producing device, which is in a state where air is blown into a parison placed in the blow mold.
Figure 5:
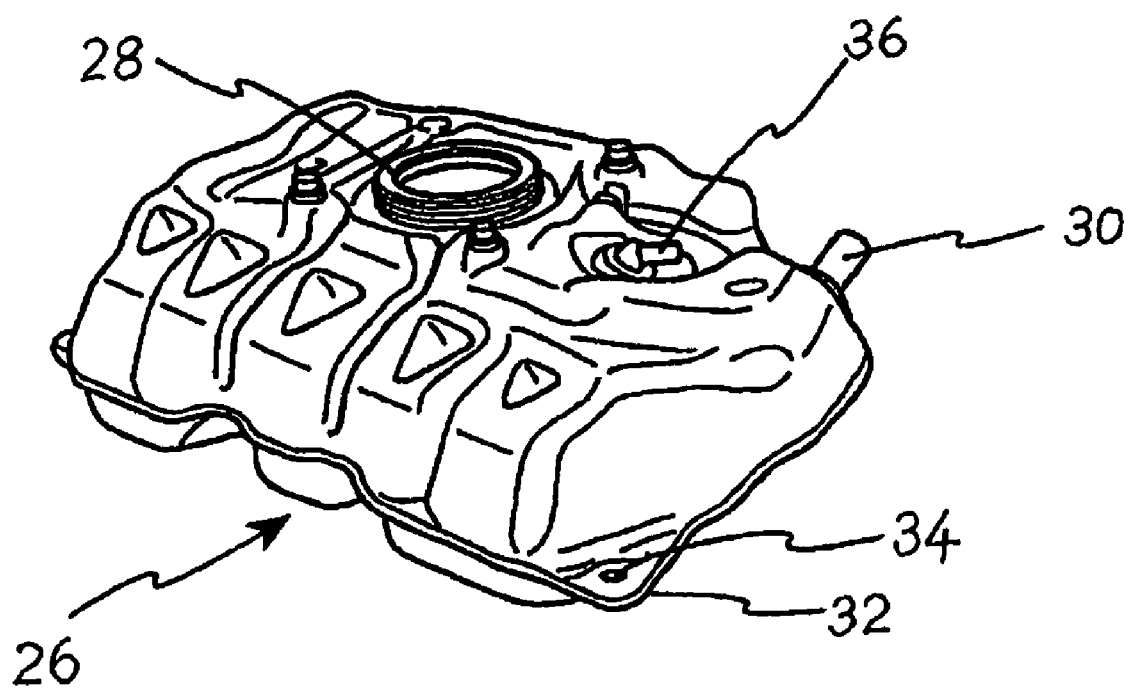
FIG. 5 is a perspective view of a fuel tank produced by embodiments of a blow molding device in accordance with the present invention.

FIG. 5 is a perspective view of a fuel tank 26, formed with embodiments of a blow molding device in accordance with the present invention.

Figure 6:
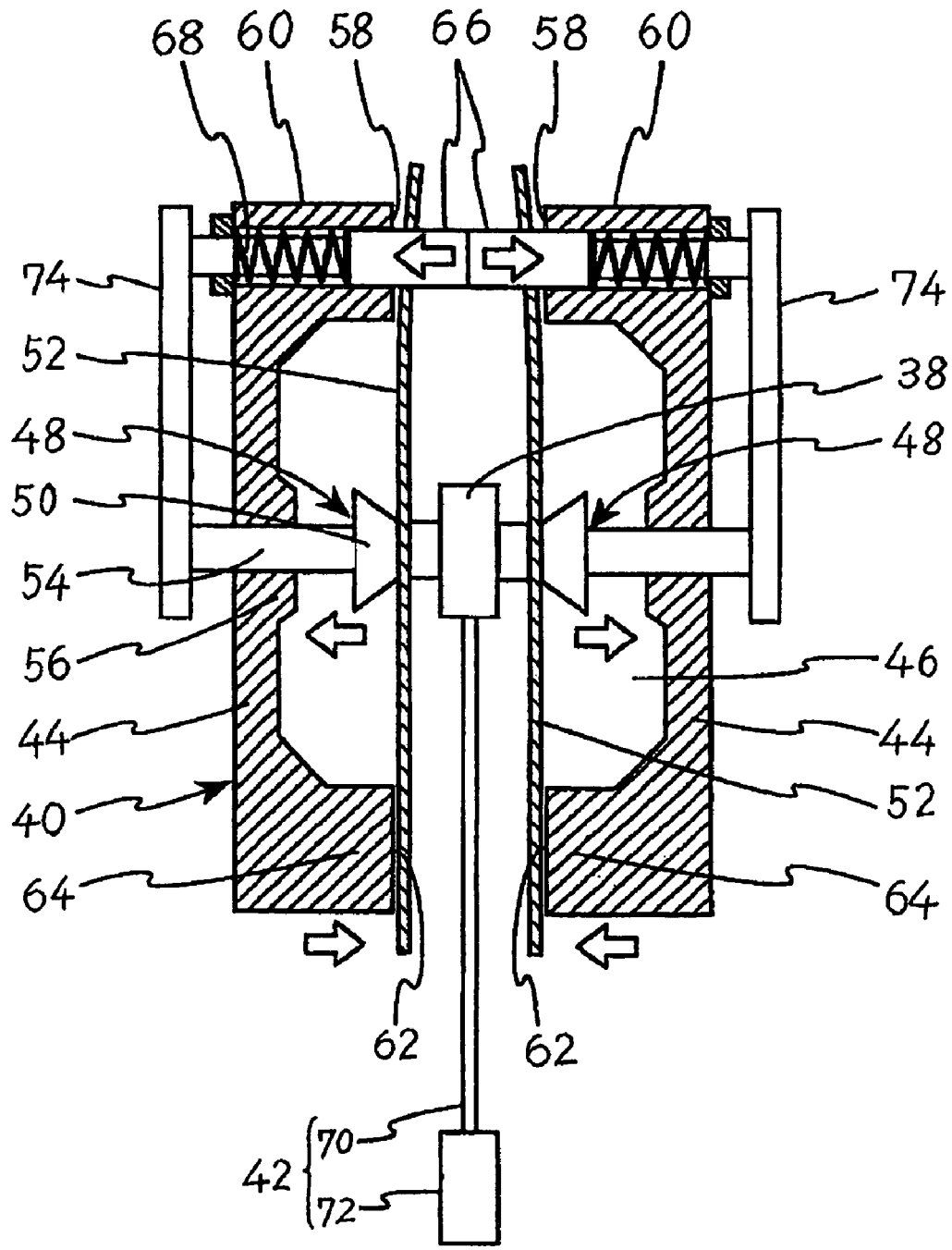
FIG. 6 is a sectional view of a first embodiment of a blow molding device in accordance with the present invention.

FIG. 6 is a sectional view showing one embodiment of a blow molding device in accordance with the present invention.

FIGS. 7 through 10 are partially cut away sectional views of a blow mold, each showing the motion of slide cores and driving control pins upon forming the blow molded article in one embodiment of a blow molding device in accordance with the present invention. FIGS. 11 through 15 are partially cut away sectional views of a blow mold, each showing the motion of slide cores and driving control pins upon forming the blow molded article in other embodiments of a blow molding device in accordance with the present invention.

As shown in FIG. 5, in one embodiment of the present invention, the fuel tank 26 formed by the blow molding device has a pump unit mounting hole 28 for mounting a fuel pump (not shown) on the fuel tank 26 in an upper surface thereof. And, a fuel inlet hole 30 is provided in a side surface or the upper surface of the fuel tank 26 for injecting fuel from an inlet pipe (not shown).

And, an outer circumferential rib 32 is provided around the fuel tank 26 over an entire length thereof, and a plurality of tank mounting holes 34 are formed in the outer circumferential rib 32 in predetermined positions such as corners, etc. thereof. By bolting the tank mounting holes 34 and a vehicle body together, the fuel tank 26 is mounted on the vehicle body.

In addition, a mounting hole 36 is provided in the upper surface of the fuel tank 26 for connecting a hose adapted to collect evaporated fuel from an interior of the tank, etc. thereto.

In the present embodiment, the fuel tank 26 is formed by a blow molding device. The outer wall of the fuel tank 26 is formed through blow molding into a single layer or multiple layers. In the case of the multiple layers, the outer wall includes a skin layer, an exterior main layer, an exterior adhesive layer, a barrier layer, an interior adhesive layer and an interior main layer.

A built-in part 38 such as a pillar member adapted to reinforce the fuel tank 26, a baffle plate adapted to prevent occurrences of waving of fuel, and consequently prevent occurrences of waving noise, a box adapted to mount fuel pumps, canisters, etc. are mounted in an interior of the fuel tank 26.

The built-in part 38 can be composed of a thermoplastic synthetic resin exhibiting a fuel oil resistance, such as polyacetal, high-density polyethylene (HDPE), etc. With this arrangement, the strength of the fuel tank 26 can be improved, and the rigidity of the fuel tank 26 is not reduced due to swelling by fuel oil, etc. even if the built-in part 38 is attached to the interior of the fuel tank 26.

The blow molding device of the present embodiment and the method for forming the blow molded fuel tank 26 using the same will be explained with reference to FIGS. 6 and 10.

First, the blow molded device will be explained with reference to FIG. 6. The blow molding device has a blow mold 40 and a built-in part holding unit 42.

The blow mold 40 is split along a parting line to provide two mold members 44. The two mold members 44 are arranged so as to be respectively slid leftward and rightward with a blow mold moving unit (not shown), thereby opening the blow mold 40. The blow mold 40 defines a cavity 46 adapted to mold the fuel tank 26 in an interior thereof. In addition, a slide core 48 is respectively provided in the two mold members 44 so as to face the cavity 46.

The slide core 48 has a head 50 adapted to partly define a molding surface around the cavity 46 upon retreating, and hold the built-in part 38 and a parison 52 upon advancing into the cavity 46, and a leg 54 integrally extending from the head 50 while penetrating a central part 56 of the blow mold 40 so as to slide relative to the blow mold 20. The slide core 48 can be provided in other positions than the central part 56 of the blow mold 40.

When the blow mold 40 is closed, the two mold members 44 of the blow mold 40 contact each other around the cavity 46. In FIG. 6, they contact each other in upper mating faces 58 of an upper part 60 of the blow mold 40 and lower mating faces 62 of a lower part 64 thereof. Drive control pins 66 are respectively provided in the upper mating faces 58 of the two mold members 44.

The drive control pins 66 are provided so as to penetrate the upper part 60 of the blow mold 40, respectively, and continuously biased by drive control springs 68 in the directions projecting from the upper mating faces 58 of the blow mold 40. With this arrangement, when the blow mold 40 is closed, tip ends of the drive control pins 66 provided in the upper part 60 of the blow mold 40 can contact each other. And, simultaneously with the contacting of the tip ends of the drive control pins 66, the slide cores 48 contact the parison 52.

Back ends of the drive control pins 66 and the legs 54 of the slide cores 48 are connected with linking members 70 outside the blow mold 40. The linking members 70 can synchronize the advancing movement and the retreating movement of the slide cores 48 with those of the drive control pins 66.

The built-in part holding unit 42 has a built-in part holding rod 70 adapted to hold the built-in part 38 and a holding rod sliding mechanism 72 adapted to slide the built-in part holding rod 70 upwardly and downwardly. The built-in part 38 is held in the cavity 46 with the built-in part holding rod 70, and when the parison 52 is lowered in the cavity 46 of the blow mold 40, the built-in part 38 is inserted in the parison 52, whereby the built-in part 38 can be mounted in the fuel tank 26 as a blow molded article. A plurality of built-in part holding rods 70 can be provided.

The built-in part holding rod 70 is arranged so as to retreat from the blow mold 40 after the built-in part 38 is positioned in the interior of the parison 52, and the parison 52 is held with the blow mold 40. After the built-in part 38 is mounted in the interior of the parison 52 held with the blow mold 40, the blow mold 40 is closed to securely close an opening of the parison 52.

Next, the method for forming a fuel tank 26 as a blow molded article using the blow molding device in accordance with the present invention will be explained with reference to FIGS. 7 through 10.

Figure 7:
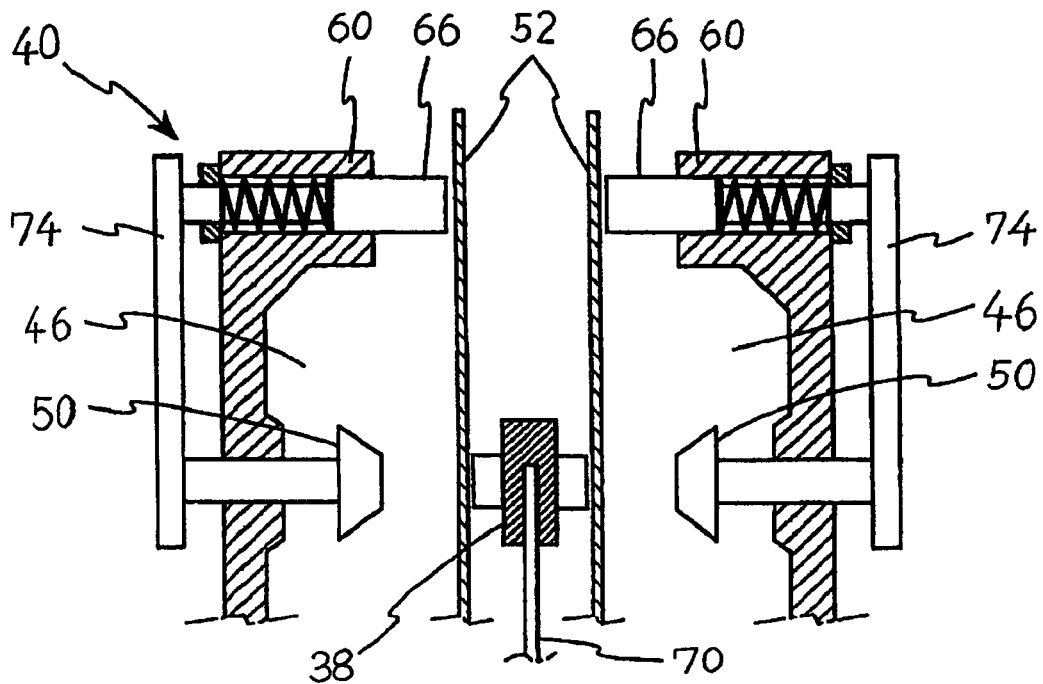
FIG. 7 is a sectional view of a first embodiment of a blow molding device, which is in a state where a parison enters a blow mold in a process of producing a blow molded article with slide cores and drive control pins.

First, as shown in FIG. 7, the blow mold 40 is opened, and the built-in part 38 is supported by the built-in part holding rod 70. Then, the built-in part 38 is positioned in the cavity 46 of the blow mold 40 by the holding rod sliding mechanism 72. And, the parison 52 is lowered to position the built-in part 38 in the interior of the parison 52.

The drive control pins 66 are respectively attached to the mold members 44 to project inwardly from the upper mating faces 58 thereof. And the slide cores 48 are provided to project into the cavity 46 from the molding surfaces defining the same.

Figure 8:
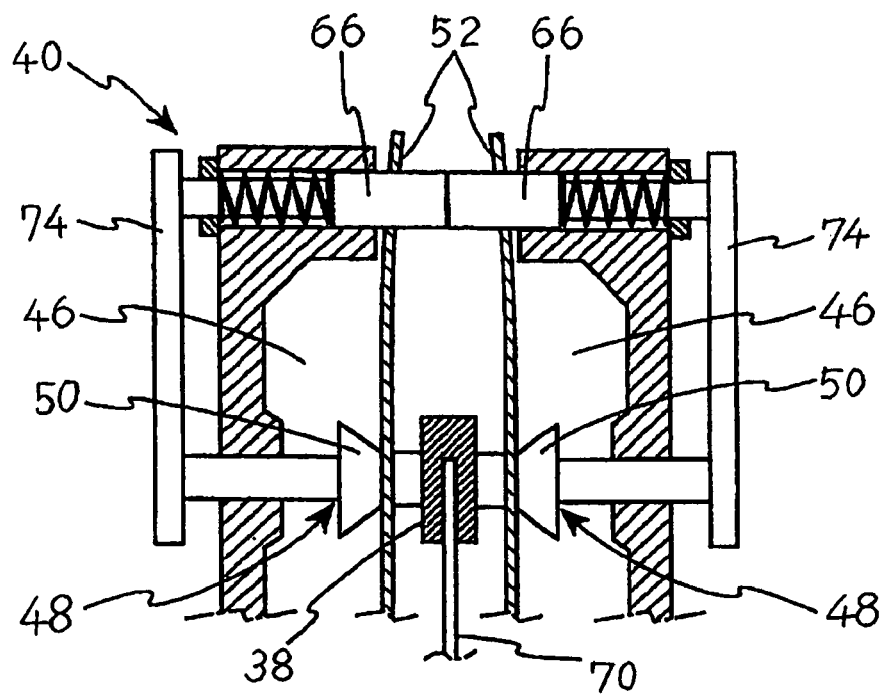

And, as shown in FIG. 8, the blow mold 40 is closed slightly, and the slide cores 48 hold the parison 52 and the built-in part 38. At the same time, the tip ends of the drive control pins 66 contact each other. Since the slide cores 48 are provided in the positions facing the built-in part 38, the parison 52 and the built-in part 38 can be pushed with two slide cores 48. As a result, the parison 52 can be pressed against the built-in part 38 with the two slide cores 48. At least one slide core 48 is respectively provided in the mold members of the blow mold 40, which is separated from each other along a parting line thereof. Alternatively, two or more slide cores may be provided according to the configuration of the built-in part 38.

And the drive control pins 66 and the slide cores 48 are connected to each other by the linking members 74 such that the movements of the slide control pins 66 and the slide cores 48 are linked with each other. When the blow mold 40 moves in its closing direction, the slide cores 48 can retreat by the drive control pins 66 in contact with the parison 52.

Two slide cores 48 provided to project from the mold members 46 of the blow mold 40 retreat from the interior of the cavity 46 at the same speed and by the same moving distance as the closing speed and the closing distance of the blow mold 40 while linking with the drive control pins 66. Consequently, the retreating of the slide core 48 can be synchronized with the mold closing movement of the blow mold 40 so that the slide core 48 can continuously hold the built-in part 38, leaving a predetermined space therebetween. Therefore, the blow mold 40 can be closed with the built-in part 38 in contact with the parison 52. Thus, the driving device for the slide core 48, which is synchronized with the closing of the blow mold, can be made simple.

In this state, an inner surface of the parison 52 is still in a molten state so that the parison 52 is pressed with the built-in part 38 to be fused to the built-in part 38. At this time, the built-in part 38 is held with the built-in part holding rod 70 and the slide cores 48 so that the built-in part 38 can be securely attached to a prescribed position of the inner surface of the fuel tank 26.

Figure 9:
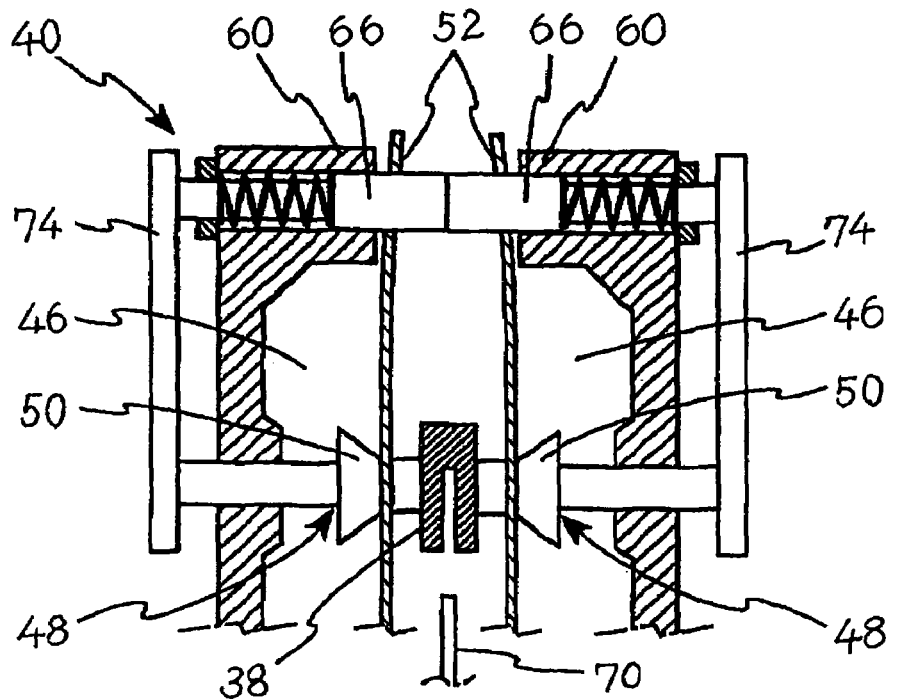
FIG. 9 is a sectional view of a first embodiment of a blow molding device, which shows a process similar to that of FIG. 7, wherein drive control pins contact each other, and a built-in part holding rod is removed from a blow mold.

Then, as shown in FIG. 9, the built-in part holding rod 70 is lowered by the holding rod sliding mechanism 72 with the built-in part 38 held with two slide cores 48, and is removed from the blow mold 40. Next, the blow mold 40 is closed to close the parison 52. Consequently, an opening formed at a tip end of the parison 52 by the built-in part holding rod 70 can be closed. Alternatively, the opening formed at the tip end of the parison 52 can be closed by closing a pinching plate provided outside the blow mold 40 without closing the blow mold 40.

Furthermore, the blow mold 40 is further closed, and the parison 52 is cut by a slide cutter (not shown). At this time, the blow mold 40 remains slightly opened without being not completely closed. When the blow mold 40 is closed, the slide cores 48 continuously press the parison 52 against the built-in part 38, whereby the built-in part 38 can be continuously held in a prescribed position.

Figure 10:
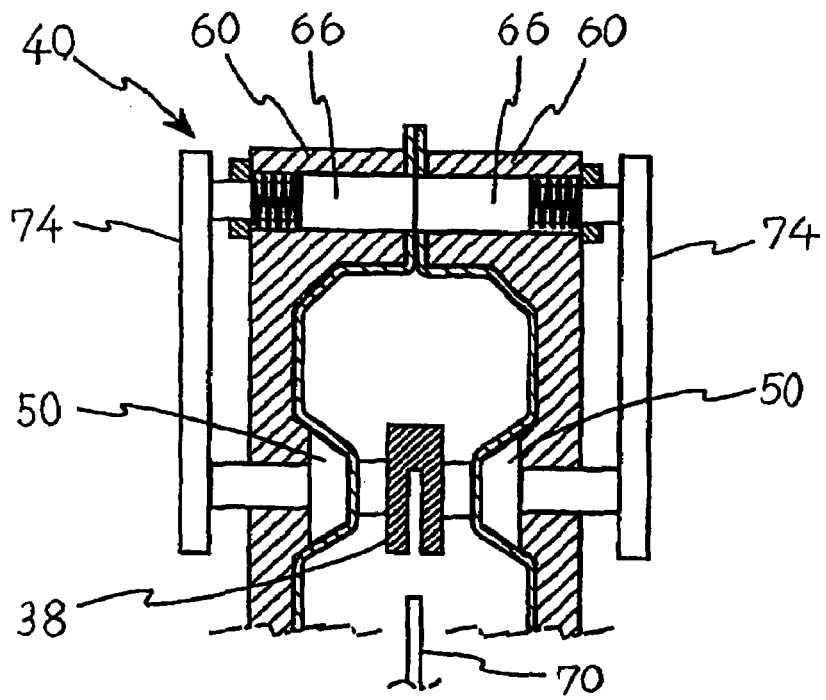
FIG. 10 is a sectional view of a first embodiment of a blow molding device, which shows a process similar to that of FIG. 7, wherein a blow mold is closed, and a parison is inflated to closely contact a blow mold.

Then, as shown in FIG. 10, the blow mold 40 is closed completely. Consequently, ends of the parison 52 can be completely closed with the blow mold 40. At this time, tip end faces of the slide cores 48 and the molding surfaces of the blow mold 40, which define the cavity 46, can become flush with each other. And by blowing air into the interior of the parison 52 from an air nozzle (not shown) to press the outer surface of the parison 52 against the blow mold 40 completely, the fuel tank 26 as a blow molded article can be configured completely. And by removing air from the parison 52 via an air vent port while blowing air via the air nozzle, air is circulated in the interior of the parison 52, and blow molding is completed. Thereafter, the blow mold 40 is opened to remove the fuel tank 26 therefrom.

Figure 11:
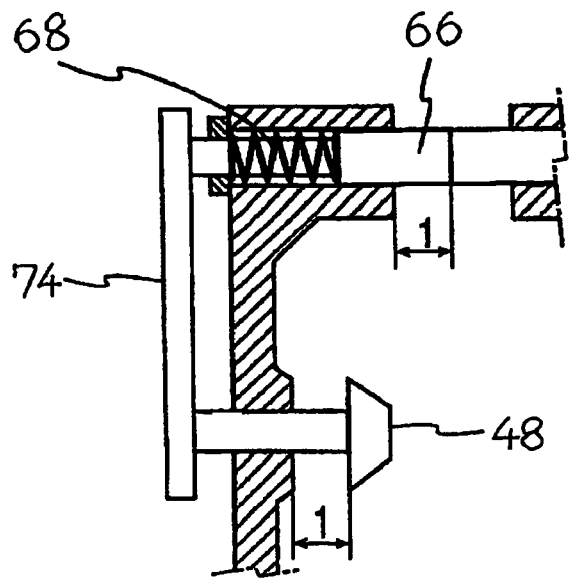
FIG. 11 is a partially sectional view of a blow mold, which shows the motion of a slide core and a drive control pin in a process of producing a blow molded article in a first embodiment of a blow molding device in accordance with the present invention.

As shown in FIG. 11, in the first embodiment, the drive control pins 66 are provided in the upper part 60 of the blow mold 40 so as to contact each other. Therefore, the moving speed of the blow mold 40 is equal to that of the drive control pins 66, and since the slide cores 48 are linked to the drive control pins 66 via the linking members 74, the retreating speed of the slide cores 48 can be made equal to the moving speed of the blow mold 40.

Figure 12:
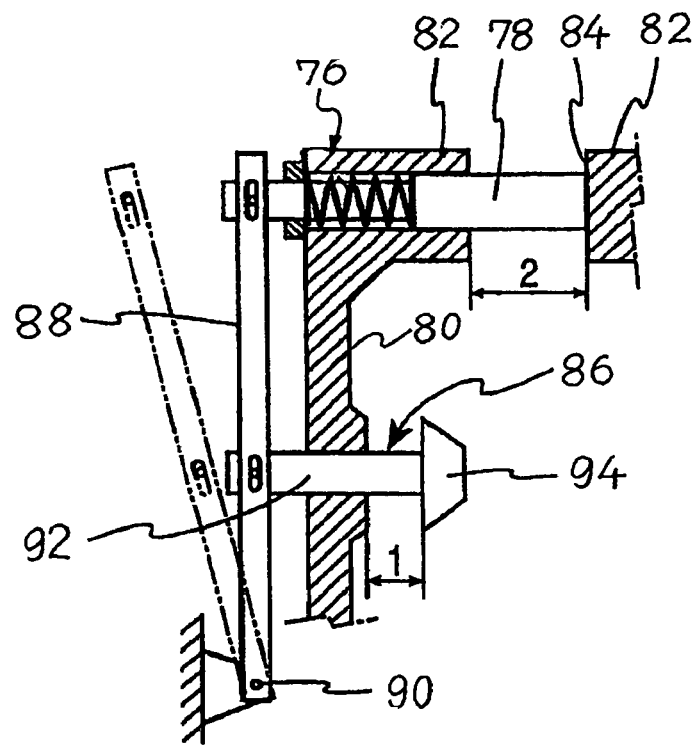
FIG. 12 is a partially sectional view of a blow mold, which shows the motion of a slide core and a drive control pin in a process of producing a blow molded article in a second embodiment of a blow molding device in accordance with the present invention.

Next, a second embodiment of the present invention will be explained with reference to FIG. 12.

A blow mold 76 used in the second embodiment is provided with drive control pins 78 in mold members 80 in an upper part of the blow mold 76. The drive control pins 78 do not contact each other, but are arranged such that when the blow mold 76 is closed, a tip end of each of the drive control pins 78 contacts an upper mating face 84 of a facing mold member 80. And the tip end of each of the drive control pins 78 contacts the upper mating face 84 of the facing mold member 80 simultaneously with the holding of a parison and a built-in part with a slide core 86. Therefore, the tip end of each of the drive control pins 78 securely contacts the upper mating face 84 of the facing mold member 82, while the slide core 86 can retreat while holding the parison and the built-in part by virtue of the drive control pins 78.

In this case, the mold members 80 approach each other at the same speed, and consequently, the drive control pins 78 retreat at the speed and by the distance twice the closing speed and the closing distance of the blow mold 76. In order to hold the built-in part with the slide core 86, the moving speed and the moving distance of the slide core 86 must be half of those of the drive control pin 78.

Accordingly, a linking member 88 is arranged such that one end thereof is turnably secured to the mold member 80 with an attaching pin 90, and the drive control pin 78 is secured to the other end of the linking member 88, and a leg 92 of the slide core 86 is secured to about a longitudinally center of the linking member 88. With this arrangement, the linking member 88 reduces the moving speed and the moving distance of the drive control pin 78 to half, and transmits the reduced moving speed and reduced moving distance to the slide core 86, thereby sliding the slide core 86 from the interior of the cavity at the same speed and by the same distance as those of the closing of the blow mold 76. Consequently, where the retreating speed and the retreating distance of the drive control pin 78 are twice as large as those of the blow mold 76, a head 94 of the slide core 86 can hold the built-in part and the parison continuously.

Figure 13:
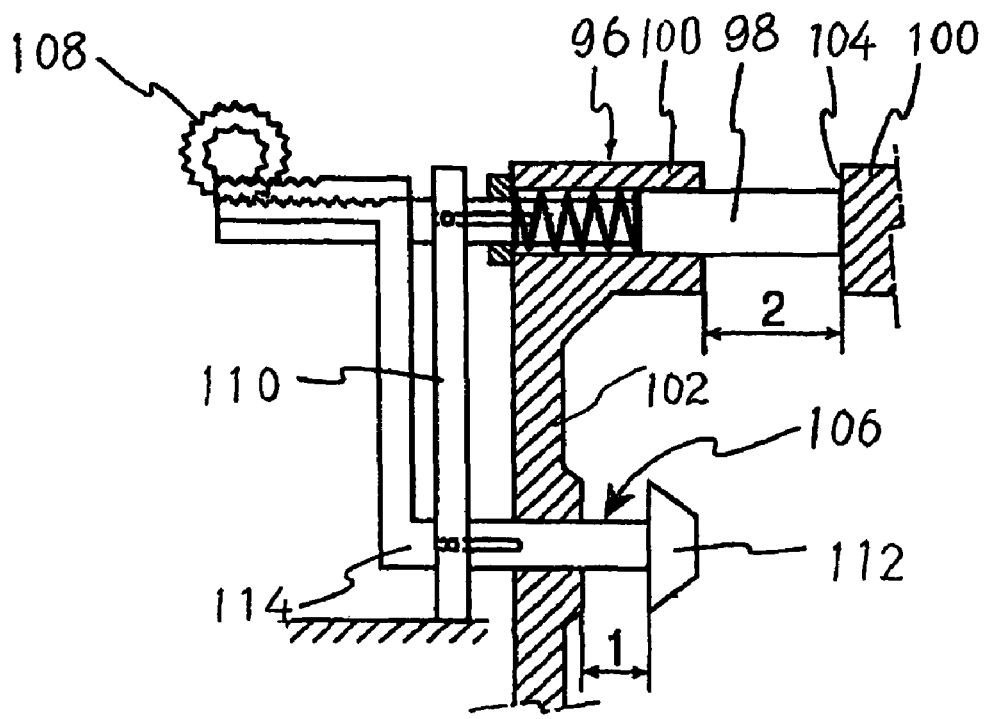
FIG. 13 is a partially sectional view of a blow mold, which shows the motion of a slide core and a drive control pin in a process of producing a blow molded article in a third embodiment of a blow molding device in accordance with the present invention.

Next, a third embodiment of the present invention will be explained with reference to FIG. 13.

A blow mold 96 used in the third embodiment is provided with drive control pins 98 in upper parts 100 of mold members 102. The drive control pins 98 do not contact each other, but are arranged such that when the blow mold 96 is closed, a tip end of each of the drive control pins 98 contact an upper mating face 104 of a facing mold member 102, similarly to the second embodiment.

Therefore, in the present embodiment, in order to reduce the sliding speed and the sliding distance of a slide core 106 to half of those of the drive control pin 98, a linking member driving gear 108 is provided in the vicinity of a back end of the drive control pin 98. The linking member driving gear 108 includes a larger gear and a smaller gear provided on the same axis in close contact with each other. The number of teeth of the larger gear is determined twice as large as that of the smaller gear.

A gear is provided in the back end of the drive control pin 98 so as to mesh with the larger gear, whereas another gear is provided in one end of a linking member 110 so as to mesh with the smaller gear. With this arrangement, the linking member driving gear 108 reduces the moving speed and the moving distance of the drive control pin 98 to half, and transmits the reduced moving speed and the moving distance to the linking member 110, and consequently, the slide core 106 retreats from an interior of a cavity of the blow mold 96 at the same speed and by the same distance as those of the closing of the blow mold 96. Consequently, where the moving speed and the moving distance of the drive control pin 98 are twice as large as those of the blow mold, a head 112 of the slide core 106 can continuously hold a built-in part and a parison.

Figure 14:
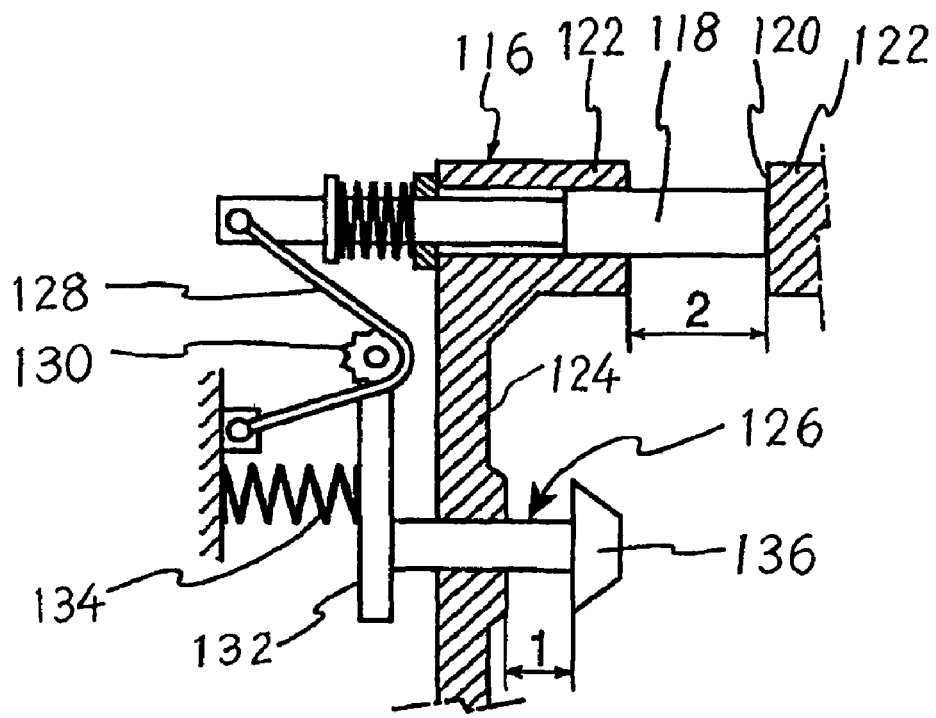
FIG. 14 is a partially sectional view of a blow mold, which shows the motion of a slide core and a drive control pin in a process of producing a blow molded article in a fourth embodiment of a blow molding device in accordance with the present invention.

Next, a fourth embodiment of the present invention will be explained with reference to FIG. 14.

In a blow mold 116 used in the fourth embodiment, a tip end of each of drive control pins 118 contacts an upper mating face 120 of a facing mold member 124, similarly to the second embodiment and the third embodiment.

Therefore, in the present embodiment, the moving speed and the moving distance of a slide core 126 must be half of those of the drive control pin 118. To this end, a linking member driving belt 128 is provided in the vicinity of a back end of the drive control pin 118.

One end of the linking member driving belt 128 is secured to the back end of the drive control pin 118, whereas the other end thereof is secured to one part of the blow mold 116. A rotating body 130 is secured to one end of a linking member 132. The rotating body 130 rotates with the linking member driving belt 128 such that the linking member 132 retreats with the movement of the rotating body 130. The linking member 132 is biased with a drive control spring 134 in the direction of the blow mold 116. When the drive control pin 118 retreats, the one end of the linking member driving belt 128 is pulled backwards with the drive control pin 118. The moving speed and the moving distance of the linking member 132 is reduced to half of those of the drive control pin 118.

With this arrangement, the linking member driving belt 128 reduces the moving speed and the moving distance of the drive control pin 118 to half, and transmits the reduced moving speed and the moving distance to the linking member 132, and consequently, the slide core 126 retreats from an interior of a cavity of the blow mold 116 at the same speed and by the same distance as those of the blow mold upon closing the same. Consequently, where the moving speed and the moving distance of the drive control pin 118 are twice as large as those of the blow mold 116, a head 136 of the slide core 126 can hold a built-in part and a parison continuously.

Figure 15:
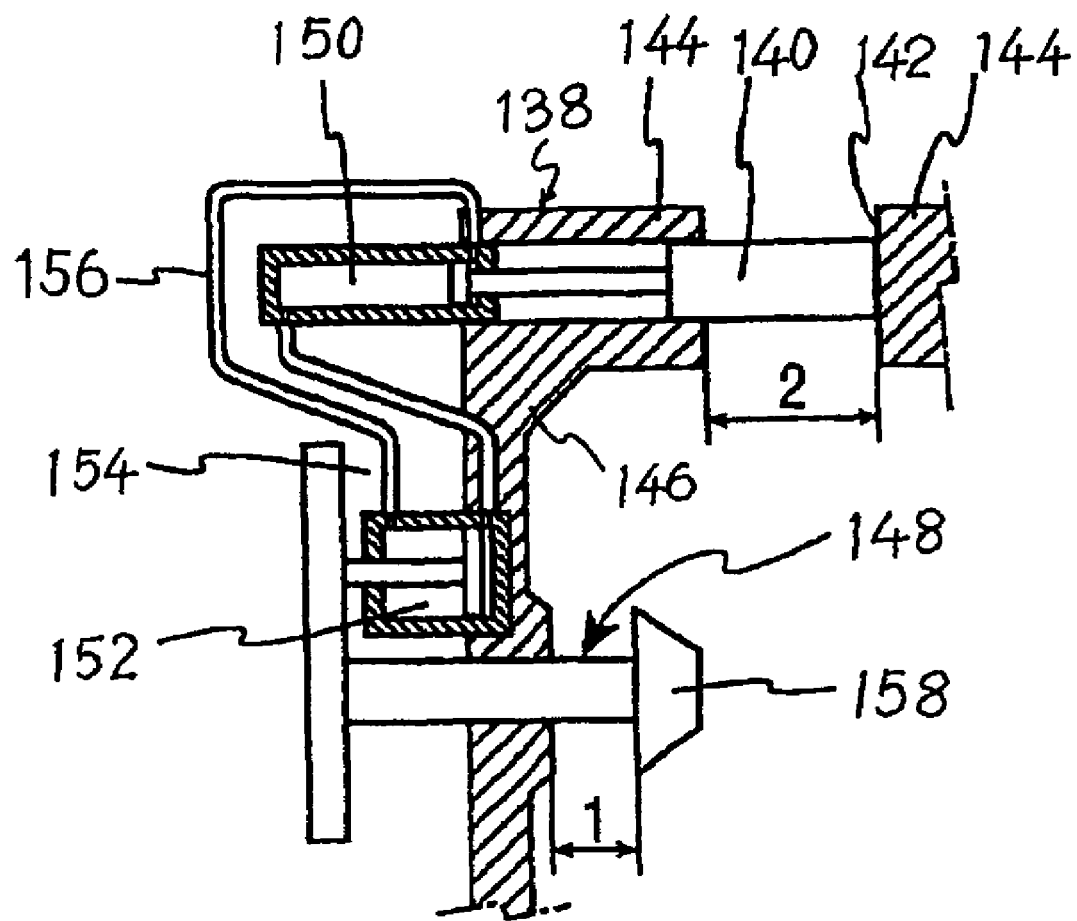
FIG. 15 is a partially sectional view of a blow mold, which shows the motion of a slide core and a drive control pin in a process of producing a blow molded article in a fifth embodiment of a blow molding device in accordance with the present invention.

Next, a fifth embodiment of the present invention will be explained with reference to FIG. 15.

In a blow mold 138 used in the fifth embodiment, a tip end of each of drive control pins 140 contacts an upper mating face 142 of a facing mold member 146, similarly to the second through fourth embodiments. Therefore, in the present embodiment, the moving speed and the moving distance of a slide core 148 must be reduced to half of the drive control pin 118. Accordingly, a drive control pin cylinder 150 is provided at a back end of the drive control pin 140, and a linking member driving cylinder 152 is provided in a linking member 154.

The drive control pin cylinder 150 has the cross-sectional area that is half of that of the linking member driving cylinder 152. The drive control pin cylinder 150 and the linking member driving cylinder 152 are interconnected to each other via a connection hose 156 so as to move fluid charged in an interior of the drive control pin cylinder 150 and fluid charged in an interior of the linking member driving cylinder 152 therebetween. When the drive control pin 140 retreats, fluid is fed from the drive control pin cylinder 150 to the linking member driving cylinder 152 to reduce the moving speed and the moving distance of the linking member driving cylinder 152 to half of those of the drive control pin cylinder 150.

The drive control pin cylinder 150 and the linking member driving cylinder 152 reduce the moving speed and the moving distance of the drive control pin 140 to half, and transmits the reduced moving speed and the reduced moving distance to the linking member 154, and consequently, the slide core 148 retreats from an interior of a cavity of the blow mold 138 at the same speed and by the same distance as those of the blow mold upon closing the same. Therefore, where the moving speed and the moving distance of the drive control pin 140 are twice as large as those of the blow mold 138, a head 158 of the slide core 148 can hold a built-in part and a parison continuously.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A blow molding device for forming a blow molded article provided with a built-in part in an interior thereof, comprising:
   a blow mold adapted to form an outer wall of the blow molded article; and
   a built-in part holding unit adapted to hold the built-in part in the blow molded article, which is provided in an opening and closing section of the blow mold,
   said blow mold including two mold members split along a parting line thereof, said two mold members defining a cavity adapted to form said outer wall of the blow molded article while holding a parison therewith,
   said built-in part holding unit including a holding rod adapted to hold the built-in part, said holding rod being arranged to freely advance and retreat such that when said blow mold is opened, said built-in part is held in a position facing said cavity of opened blow mold, whereas when said blow mold is closed, said built-in part is positioned in an interior of said parison, and after holding said parison with said blow mold, said holding rod is removed from said blow mold
   each of said two mold members of said blow mold including a slide core that is provided in such a position as to hold said built-in part and said parison so as to freely advance and retreat relative to said cavity when said blow mold is closed, a drive control pin provided in each of mating faces of said mold members, and a linking member adapted to link said drive control pin and said slide core with each other such that said slide core is driven with said drive control pin, and
   said slide core being arranged such that when said blow mold is closed, said slide core retreats from an interior of said cavity to said molding face defining said cavity at the same speed as the closing speed of said blow mold.

2. A blow molding device as claimed in claim 1, wherein said drive control pin provided in each of said mold members projects from each of said mating faces of said mold members such that when said blow mold is closed, tip ends of said drive control pins contact each other simultaneously with the holding of said built-in part and said parison with said slide core, and said slide core links with said drive control pin and retreats from an interior of said cavity at the same speed as a closing speed of said mold members.

3. A blow molding device as claimed in claim 1, wherein said drive control pin provided in each of said mold members projects from each of mating faces of said mold members such that when said blow mold is closed, a tip end of each of said drive control pins contacts a facing mating face of each of said mold members simultaneously with the holding of said built-in part and said parison with said slide cores, and said linking member has a reducing mechanism of reducing the retreating speed of said slide core to half of that of said drive control pin, whereby said slide core retreats from said interior of said cavity to a molding surface thereof at the same speed as a closing speed of said mold members.

4. A blow molding device as claimed in claim 1, wherein said drive control pin is continuously biased with a drive control spring provided in said mating face of said mold member in such a direction as to project from said mating face of said mold member.

* * * * *